Patented Sept. 1, 1942

2,294,765

UNITED STATES PATENT OFFICE 2,294,765

LIQUID PURIFICATION

Oliver M. Urbain and William R. Stemen, Columbus, Ohio, assignors to Charles H. Lewis, Harpster, Ohio No Drawing. Application July 10, 1939, Serial No. 283,675

6 Claims. (Cl. 210—24)

This invention relates to water softening and liquid purification. More specifically, it relates to materials and processes for the removal of cations from liquids by a process of cation or hydrogen exchange.

Our co-pending application, Serial No. 283,674, filed of even date herewith discloses and claims the hydrogen exchange material employed in the process of the invention of the present application.

Processes of water softening and cation removal have been known for a number of years. Perhaps the most commonly used materials are the zeolites, or alumino-silicates, although many other compounds having base exchange properties have been prepared. Recently there have been developed hydrogen zeolites, which are utilized to exchange hydrogen cations for base forming cations in liquids.

Such compounds, however, have certain inherent disadvantages. The natural zeolites and the hydrogen zeolites while quite stable when brought into contact with aggressive waters, in general, have a low capacity which necessitates frequent regeneration. On the other hand, the numerous synthetic zeolites which have been prepared have a much greater capacity for cation exchange but are far less durable and disintegrate rather rapidly when employed with aggressive waters.

We have found that, through the use of the materials and processes hereinafter described, the disadvantages inherent with both natural, synthetic and hydrogen zeolites of the prior art are overcome, and that exchange of hydrogen for basic cations may be effected in highly aggressive waters while, at the same time, frequent regeneration of the exchange materials may be avoided.

It is an object of this invention to provide materials and processes for efficient cation exchange. It is a further object of this invention to provide materials, and processes for the preparation of such materials, which possess high capacity for exchange of hydrogen for basic cations and which are highly stable when used even in aggressive waters. A still further object of this invention is to provide a simple and economic process by which stable high capacity hydrogen exchange materials may be prepared. Another object of this invention is the provision of efficient methods of effecting hydrogen exchange with such materials, and effecting regeneration of such materials when exhausted.

Other objects will be apparent to those skilled in the art from the following description of the processes and materials employed.

The materials which we have found are particularly stable and possess high exchange capacity are those prepared in the following manner.

Hard or semi-hard coals, such, for example, as Pocahontas or Pittsburgh #8, and bituminous coals, such, for example, as Hocking coal, serve as a basis for our novel materials. Generally speaking, the hard and semi-hard coals yield hydrogen exchange materials higher in capacity than those prepared from the bituminous coals.

The initial step in the preparation of our hydrogen exchange materials comprises mixing the selected coal, in dry granular form, with anhydrous ferric chloride and heating such a mixture to a temperature of approximately 300° C., with constant stirring, until reactions between the components of the mixture is complete.

It is of primary importance that the components of the mixture be entirely free from moisture, and for this reason the coal must be dry and the ferric chloride must be anhydrous.

In its anhydrous form, ferric chloride melts at 282° C. and sublimes at 315° C. The reaction between coal and ferric chloride is effected when the ferric chloride is in molten form, and, therefor, reaction between the components of the mixture must be effected at temperatures within this range, i. e., between 282° C. and 315° C.

Although the proportions of coal and ferric chloride contained within the mixture is not critical, we have found that the best hydrogen exchange materials are those prepared when approximately 100 parts by weight of coal is reacted with 80 parts by weight of ferric chloride. A smaller proportion of ferric chloride results in the production of a material having lower capacity for exchange of hydrogen for basic cations.

In general, the coal is ground and graded to a size lying within the range of 8 to 20 mesh. It is then mixed with the anhydrous ferric chloride and heated to the proper temperature, approximately 300° C. with constant stirring and agitation.

Reaction between the components of the mixture is generally quite rapid and is usually completed in less than 30 minutes. Completion of the reaction is indicated by the fact that the reaction mixture becomes thorougly dry due to the disappearance of the molten ferric chloride.

After reaction between the components of the mixture is completed, the mass is cooled and water washed until the water washings are substantially colorless. The reaction mass is then treated with an acid solution of relatively low concentration for a period of from approximately 10 to 30 minutes. Acids, such, for example, as hydrochloric and sulfuric acids may be used for this purpose, and the concentration of the acid solution may vary from 2 to 10%.

After treatment of the reaction mass with acid solutions, the mass is water washed to free it of acid, and is then dried.

By such a process, there is prepared a hydrogen exchange material of high capacity and of unusual stability. The hydrogen exchange material constains hydrogen cations, which, when contacted with solutions containing basic cations, will replace the latter.

The chemical explanation of the reaction involved in the preparation of our novel materials is believed to be as follows.

It is believed that when coal is treated with molten anhydrous ferric chloride, the ferric iron is partially reduced to the ferrous state. The chlorine liberated by this oxidation-reduction reaction is then believed to react with the hydrogen of volatile hydrocarbons of the coal opening up the ring structures thereof. Since gaseous hydrogen chloride is given off in copious quantities, it is believed that the ferrous iron goes into the exchange position in the coal, and that subsequent treatment of the mixture with an acid results in replacement of the ferrous cation by the hydrogen cation, thus producing an exchange material replete with exchangeable hydrogen cations.

Stated otherwise, it is believed that the ferric chloride oxidizes certain portions of the constituents of the coal to active groupings for hydrogen or cation exchange. As fast as the active groupings are formed it is thought they are stabilized in the active state by the ferric or ferrous iron present, thus preventing further oxidation to an inactive state. The ferric chloride probably acts as a condensing agent to stabilize the coal constituents. The vigorous oxidation-reduction reaction is believed to open up the ring structures to yield groupings active in hydrogen or cation exchange.

Although we believe the foregoing to be a satisfactory explanation of the chemistry involved in the formation of our active hydrogen exchange materials, it is to be understood that this explanation is not to be considered as limiting the invention in any way whatsoever.

Illustrative of materials prepared in accordance with the teachings of this invention, the following examples are given:

*Example I*

A quantity of Pocahontas coal was ground and graded by means of sieves to obtain a fraction between 8 and 20 mesh. One hundred parts by weight of this fraction was thoroughly mixed with 80 parts by weight of anhydrous ferric chloride and the mixture heated to a temperature of 300° C. with constant stirring for a period of approximately 30 minutes. The mixture was then allowed to cool and washed free of soluble reaction products. The residual mixture was then treated for approximately 20 minutes with a 5% solution of hydrochloric acid, after which the dilute acid solution was permitted to drain from the mass and the mass thoroughly washed free of acid. After thoroughly drying, the residual mixture was screened through a 20 mesh screen and the dry product retained on the screen utilized for hydrogen exchange. There was obtained a 50.0% yield of dry products based on the total weight of coal and anhydrous ferric chloride employed.

The efficiency of the hydrogen exchange material prepared in this manner was tested by passing 10 gallons of hard well water having a total hardness of 21.24 grains per gallon through 40 grams of the prepared exchange material contained in a small filter unit. The hard well water was passed through the hydrogen exchange materials in approximately one hour. The effluent from the filtrate was carefully tested for total hardness and there was found a residual hardness of 16.92 grains per gallon, thus indicating a removal of 4.32 grains per gallon.

In order to ascertain the capacity of the hydrogen exchange material in conventional units, the total hardness removed was calculated to grains per pound of exchange material. The weight of the new exchange material was found to be 34.1 pounds per cubic foot, and by calculation, the capacity of the new hydrogen exchange material was found to be 16,047 grains per cubic foot.

An exchange material having a hydrogen exchange capacity of approximately 16,000 grains per cubic foot is believed quite novel in view of the fact that the best hydrogen exchange material now available is believed to have a capacity of only approximately 11,000 grains per cubic foot.

*Example II*

By the same procedure outlined in Example I, a hydrogen exchange material was prepared from a grade of bituminous coal known as Hocking coal.

There was obtained a yield of approximately 51.0% based on the quantity of coal and anhydrous ferric chloride employed.

The capacity of this hydrogen exchange material was tested in the same manner as that prepared in Example I, and this material was found to remove 3.25 grains per gallon of total hardness from a solution containing 21.24 grains per gallon. When calculated to the conventional basis for measuring capacity, this material was found to have a capacity of 12,942 grains per cubic foot.

It will thus be seen that materials prepared from bituminous coals by the method herein described possess a higher capacity for hydrogen exchange than the materials presently available, as far as now known, but such materials are not as effective as are materials prepared in a similar manner from hard coals such as that used in Example I.

The hydrogen exchange materials thus prepared are employed in water softening or liquid purification in conventional methods. They may be utilized in contact filters and adapted to use in the filter bed type of water softening equipment, or they may be added directly to the liquid with agitation, after which the converted exchange compounds may be separated and removed from the treated water or purified liquids.

Reaction of the hydrogen exchange materials prepared in accordance with this invention with hardness forming cations are given in the following equation. For purposes of illustration, the exchange materials are represented by the formula $ZH_2$.

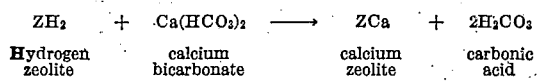

After the exchange material has become exhausted, it may be regenerated by treatment with a solution of an acid. A preferred process of regeneration comprises treating the exhausted exchange material with a solution containing from 2 to 10% of an acid, such for example as hydrochloric acid. The regenerating solution should then be washed from the exchange material preferably by a solution free of base forming cations. It has been found convenient to utilize, as the wash solution after regeneration, a quantity of water which has passed through the filter when the filter was first placed in operation. After the regenerated exchange material is again in use, a quantity of the first water passing therethrough should be reserved for washing after the next regeneration.

Representative equations for the regeneration of exchange materials which have been used to remove calcium and magnesium from hard water, are given:

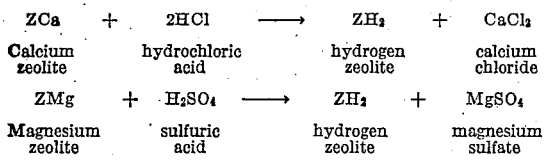

The cations removed from the water treated will, of course, be found in the regenerated solution, and, if recovery is desired, they can be removed by conventional methods, such as fractional distillation or fractional crystallization.

Materials prepared in accordance with this invention are, in general, completely regenerative. Illustrative of the capacity of a regenerated material, there is given the following example.

*Example III*

The exchange material prepared and used in Example I above, after it had been completely exhausted, was regenerated by treatment with a 5% solution of hydrochloric acid. It was then washed free of acid with a portion of the effluent obtained from that filter when first prepared. The capacity of this exchange material, after regeneration, was determined in the same manner as its original capacity was determined, and was found to be 18,782 grains per cubic foot. This represents an increase in hydrogen exchange capacity following regeneration which, it is believed, is due to the purification of the exchange material by the solution employed in the regeneration step.

It is to be expressly understood that the foregoing description and examples are merely illustrative and are not to be considered as limiting the invention beyond the scope of the subjoined claims.

We claim:

1. A process of base-exchange comprising contacting hard water with a carbonaceous hydrogen zeolite prepared from the oxidation-reduction reaction between dry granular coal and anhydrous ferric chloride in the molten state, and treating the resulting product with an acid solution containing hydrogen ions.

2. A process of base-exchange comprising contacting hard water with a carbonaceous hydrogen zeolite prepared from the oxidation-reduction reaction between dry granular hard coal and anhydrous ferric chloride at a temperature between 282° C. and 315° C., and treating the resulting product with an acid solution containing hydrogen ions.

3. A process of exchanging cations in a liquid comprising contacting said liquid with a product prepared by effecting an oxidation-reduction reaction between dry coal and anhydrous ferric chloride in the molten state and thereafter treating the resulting reaction product with an acid solution containing hydrogen ions.

4. A process of exchanging cations in hard water comprising contacting the said water with a product prepared by effecting an oxidation-reduction reaction between dry hard coal graded from 8 to 20 mesh and anhydrous ferric chloride at a temperature between 282° C. and 315° C. and thereafter treating the resulting reaction product with an acid solution containing hydrogen ions.

5. A process of hydrogen exchange comprising contacting hard water with a hydrogen exchange material prepared by mixing approximately 100 parts by weight of coal graded from 8 to 20 mesh, with approximately 80 parts by weight of sublimed ferric chloride, heating the mixture to a temperature between 282° C. and 315° C. in the absence of water to exact an oxidation-reduction reaction, with constant stirring until the molten ferric chloride disappears from the reaction mixture, cooling and water washing the resulting product, treating the resulting product with a 2 to 10% solution of an acid, and thereafter washing and drying the carbonaceous hydrogen zeolite thus obtained.

6. A process of exchanging cations in liquids comprising the steps of bringing the liquid into contact with an acid treated product of an oxidation-reduction reaction between dry granular hard coal and anhydrous ferric chloride at a temperature between 282° C. and 315° C., regenerating the exchange material when exhausted with a 2 to 10% solution of an acid free of cations which it is desired to remove from the liquid, and further contacting said material with additional liquids.

OLIVER M. URBAIN.
WILLIAM R. STEMEN.